(12) United States Patent
Koshoffer et al.

(10) Patent No.: US 7,966,823 B2
(45) Date of Patent: Jun. 28, 2011

(54) EXHAUST DUST FLOW SPLITTER SYSTEM

(75) Inventors: John Michael Koshoffer, Cincinnati, OH (US); David Elson Caldwell, West Chester, OH (US)

(73) Assignee: General Electric Company, Schenectady, NY (US)

( * ) Notice: Subject to any disclaimer, the term of this patent is extended or adjusted under 35 U.S.C. 154(b) by 1193 days.

(21) Appl. No.: 11/327,008

(22) Filed: Jan. 6, 2006

(65) Prior Publication Data

US 2007/0157621 A1    Jul. 12, 2007

(51) Int. Cl.
*F02K 3/10* (2006.01)
*F02C 1/00* (2006.01)

(52) U.S. Cl. ............................................ 60/766; 60/772

(58) Field of Classification Search ............ 60/761–766, 60/770, 772; 181/213
See application file for complete search history.

(56) References Cited

U.S. PATENT DOCUMENTS

| | | | | |
|---|---|---|---|---|
| 2,851,854 A | * | 9/1958 | Doll, Jr. ........................... | 60/766 |
| 2,910,828 A | * | 11/1959 | Meyer et al. ..................... | 60/266 |
| 3,041,836 A | | 7/1962 | Truman et al. | |
| 3,712,062 A | * | 1/1973 | Nash ................................ | 60/766 |
| 3,826,088 A | * | 7/1974 | Nash et al. ....................... | 60/766 |
| 3,866,417 A | | 2/1975 | Velegol | |
| 4,718,230 A | * | 1/1988 | Honeycutt et al. .............. | 60/766 |
| 4,813,229 A | | 3/1989 | Simmons | |
| 4,833,881 A | | 5/1989 | Vdoviak et al. | |
| 4,848,081 A | | 7/1989 | Kennedy | |
| 4,878,283 A | * | 11/1989 | McLean ........................ | 29/889.2 |
| 4,944,362 A | * | 7/1990 | Motsinger et al. ............ | 181/213 |
| 5,144,795 A | * | 9/1992 | Field ............................. | 60/226.1 |
| 5,211,007 A | | 5/1993 | Marvin | |
| 5,465,572 A | * | 11/1995 | Nicoll et al. .................... | 60/266 |
| 5,483,794 A | | 1/1996 | Nicoll et al. | |
| 5,746,047 A | * | 5/1998 | Steyer et al. ................... | 60/39.5 |
| 7,437,876 B2 | * | 10/2008 | Koshoffer ....................... | 60/761 |

* cited by examiner

*Primary Examiner* — Michael Cuff
*Assistant Examiner* — Gerald L Sung
(74) *Attorney, Agent, or Firm* — William Scott Andes, Esq.; Armstrong Teasdale LLP

(57) ABSTRACT

A gas turbine engine augmentor includes an augmentor outer casing 502 and an annular augmentor liner 504 disposed radially within and radially separated from the augmentor outer casing 502 to form a generally annular augmentor liner cooling flow path 500 between the augmentor casing and the annular augmentor liner, and an augmentor flow splitter duct 506 disposed at the upstream end of the augmentor liner and radially between the augmentor outer casing 502 and the annular augmentor liner 504 and defining a splitter flow path 520 between the annular augmentor liner 504 and the annular augmentor flow splitter duct 506. A method of operating a gas turbofan engine including an augmentor includes directing a portion of fan bypass air into a generally annular augmentor liner cooling flow path 500 between an augmentor outer casing 502 and an annular augmentor liner 504, directing a portion of the air in the augmentor liner cooling flow path 500 into a splitter flow path 520 disposed radially outside the augmentor liner 504 and maintaining positive backflow pressure margin between air flow within the splitter flow path and the augmentor liner cooling flow path 500.

11 Claims, 5 Drawing Sheets

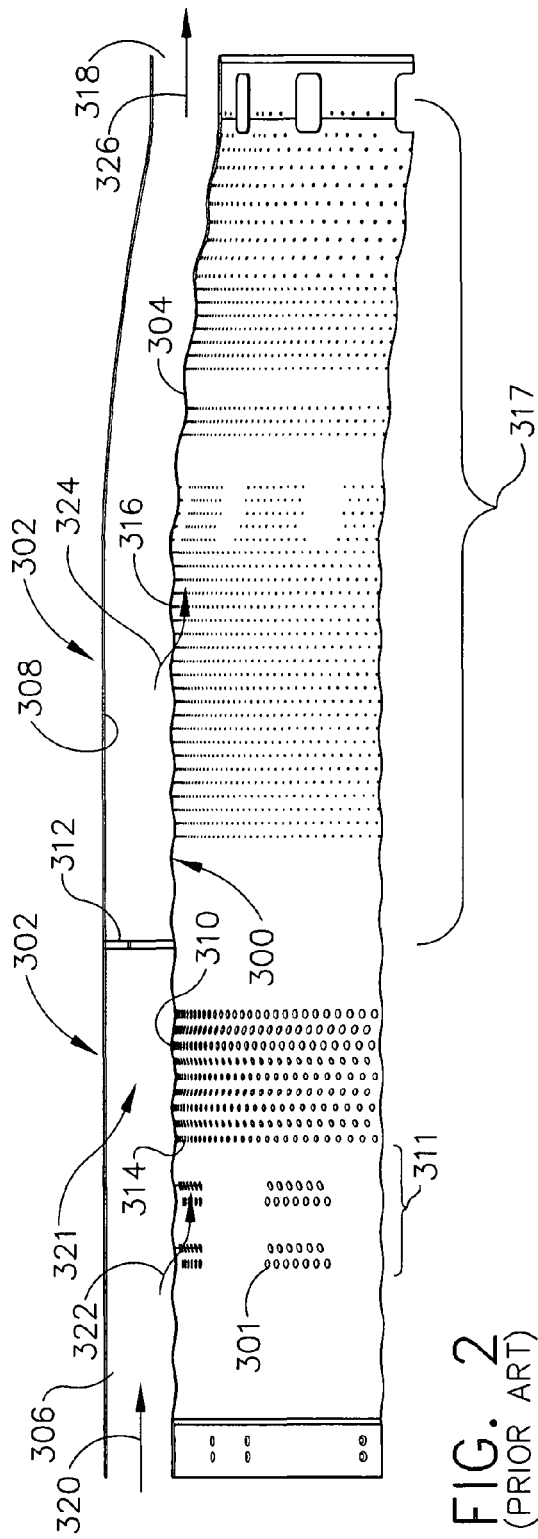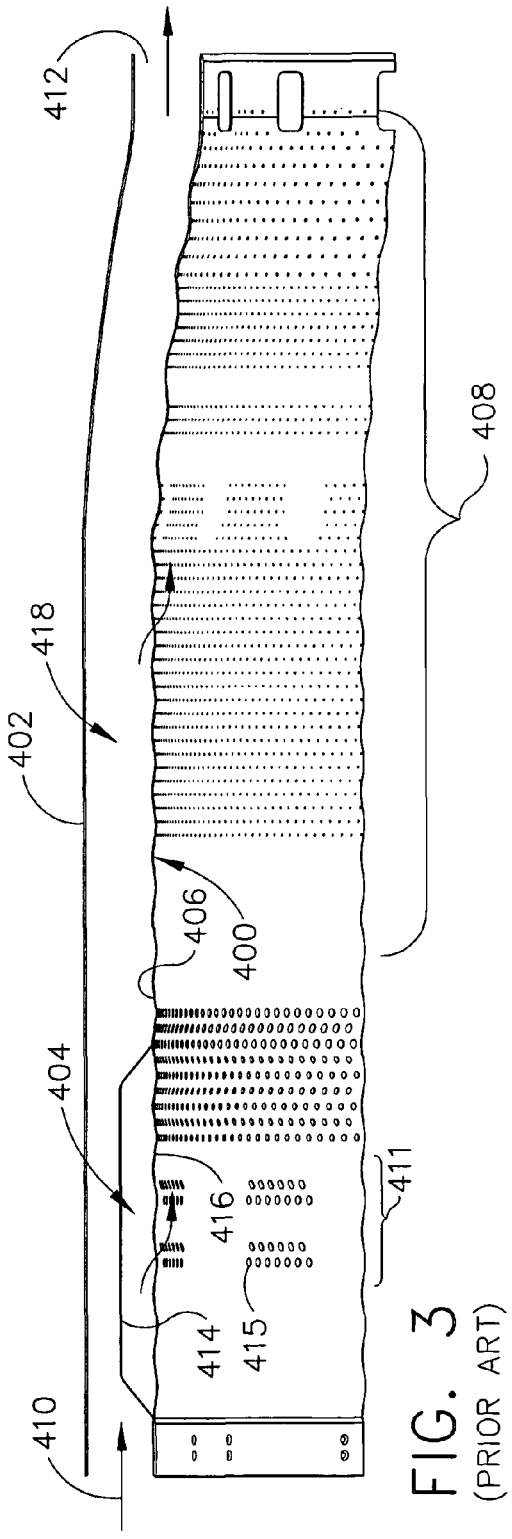
FIG. 2 (PRIOR ART)
FIG. 3 (PRIOR ART)

EXHAUST DUST FLOW SPLITTER SYSTEM

BACKGROUND OF THE INVENTION

This invention relates generally to augmented gas turbine engine, and more particularly, to an exhaust duct flow splitter apparatus and method for controlling augmentor air flow.

Gas turbine engines generally comprise a compressor for compressing air flowing through the engine, a combustor system in which fuel is mixed with the compressed air and ignited to form a high energy gas stream, and a turbine which is connected to the compressor to drive the compressor as well as provide thrust. Airflow entering the compressor is compressed and directed to the combustor where it is mixed with fuel and ignited, producing hot combustion gases used to drive the turbine. As the performance demands of aircraft have increased, performance demands of the engines have also increased. As range demands increased, low pressure rotors were added providing higher mass flow resulting in increased thrust at better specific fuel consumption. Additionally, mission demand increases became more significant for multi-role weapon systems. For example, engines are being designed to accommodate conventional take-off and landing (CTOL) operations, as well as, short-takeoff and vertical landing (STOVL) operations. One method of increasing thrust output of a gas turbine engine is to provide the engine with an augmentor, including an exhaust duct located downstream of the turbine in which additional fuel may be injected and ignited to provide an additional high energy gas stream.

Augmentors used in aviation turbofan engines produce increased thrust by burning fuel in a separate duct downstream of the jet engine exhaust to add mass to the exhaust stream. Intense combustion induced, high frequency pressure oscillations are generated under certain operating conditions in the augmentor and are known in the art as "screech". See, for example, U.S. Pat. No. 3,041,836, J. C. Truman et al, "Means for Eliminating Screech in Jet Propulsion Systems", which is assigned to the present assignee. Uncontrolled screech reduces the high-cycle fatigue life of the augmentor components due to screech-induced vibration including radial, circumferential, and axial modes, and combinations thereof.

Gas turbine engine augmentors utilize cooling liners, to provide screech suppression in the augmentor, shield the structural augmentor casing from hot augmentor combustion gases and provide cooling air to an exhaust nozzle disposed at the downstream end of the augmentor. An efficient augmentor cooling liner should provide casing thermal shielding to maintain acceptable levels of metal temperature consistent with durability and life requirements for the augmentor, while utilizing the least possible amount of air for augmentor cooling.

Augmentors are generally long structures when compared to engine size and must accommodate relatively high combustion gas temperatures, both of which conditions require a substantial amount of cooling air. To improve efficiency, gas turbine engine augmentors typically utilize relatively highly effective film-cooling structures, such as are found in engine combustors. Augmentor combustion efficiency is determined by the proportional amount of discharge gases available from the gas turbine engine used for augmentor combustion. Accordingly, any engine discharge gases, for example fan bypass air utilized for cooling the augmentor liner and not used in the augmentor combustion process, decreases augmentor temperature capability and efficiency. It therefore becomes apparent that reducing the amount of air required for cooling the augmentor correspondingly increases augmentor efficiency.

BRIEF DESCRIPTION OF THE INVENTION

In one aspect of the invention, a gas turbine engine, which includes an augmentor includes an augmentor outer casing and an augmentor liner disposed radially within and radially separated from the augmentor outer casing to form a generally annular augmentor liner cooling flow path between the augmentor casing and the annular augmentor liner, has an augmentor flow splitter duct disposed at the upstream end of the augmentor liner and radially between the augmentor outer casing and the annular augmentor liner to define a splitter flow path between the annular augmentor liner and the annular augmentor flow splitter duct.

In another aspect, a method of operating an augmented gas turbine engine includes directing a portion of fan bypass air into a generally annular augmentor liner cooling flow path between an augmentor outer casing and an annular augmentor liner, directing a portion of the air in the augmentor liner cooling flow path into an augmentor splitter flow path disposed radially outside the augmentor liner and maintaining positive backflow pressure margin between air flow within the augmentor splitter flow path and the augmentor liner cooling flow path.

BRIEF DESCRIPTION OF THE DRAWINGS

FIG. 2 is a schematic, partial, longitudinal view of the interior of an augmentor exhaust duct liner;

FIG. 3 is a schematic, partial, longitudinal, cross-sectional view showing details of a prior art augmentor exhaust duct liner;

DETAILED DESCRIPTION OF THE INVENTION

Figure 1:
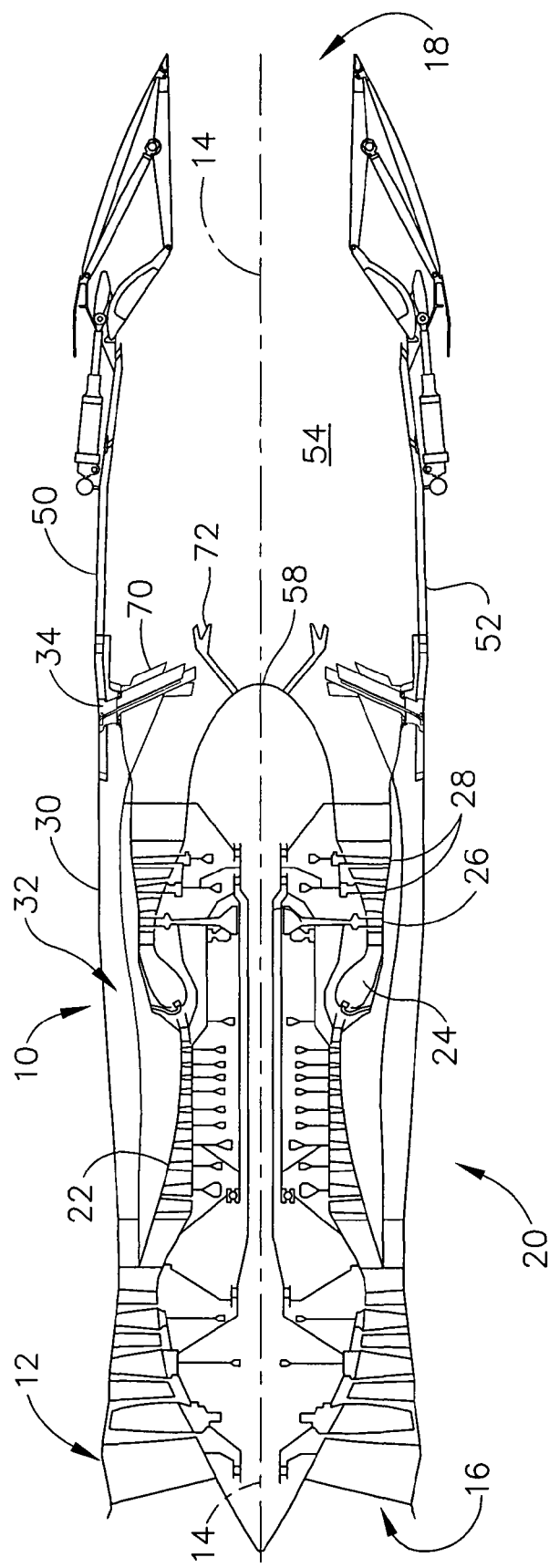
FIG. 1 is a schematic, partial, longitudinal, cross-sectional view of a gas turbine engine including an augmentor exhaust duct liner.

FIG. 1 is a cross-sectional side view of a gas turbine turbofan engine 10 including a fan assembly 12, such as an F110 engine manufactured by GE Transportation, Cincinnati, Ohio. Engine 10 has a generally longitudinally extending axis or centerline 14 extending from an inlet end 16 aftward to an exhaust end 18. Engine 10 includes a core engine 20 which includes a high pressure compressor 22, a combustor 24, a high pressure turbine 26, and a power turbine or a low pressure turbine 28, all arranged in a serial, axial flow relationship. Engine 10 also includes an annular casing 30 which defines the outer boundary of a bypass duct 32 surrounding the core engine 20.

A fan nozzle 34 extends aftward from casing 30 and connects core engine 30 to augmentor system 50. Fan nozzle 34 defines a portion of an outer boundary of an engine exhaust flowpath 54. More specifically, fan nozzle 34 directs combustion gases discharged from core engine 20 and airflow exiting bypass duct 32 downstream through augmentor system 50. A plurality of circumferentially spaced fuel spraybars and flameholders 70 are located in a position axially aligned with the fan nozzle 34. A centerbody 58 extends aftward from core engine 20 and supports a conventional annular flameholder 72 downstream of the fuel spraybars and flameholders 70.

During operation, air is drawn through inlet 16 into fan assembly 12. The air is compressed and a portion of the compressed air is discharged downstream at an increased pressure and temperature to high-pressure compressor 22. The remaining portion of the fan discharge air enters fan bypass duct 32. Pressurized air from high pressure compressor 22 is mixed with fuel in combustor 24 and ignited, thereby generating combustion gases. Such combustion gases drive high pressure turbine 26, which drives high pressure compressor 22 and are discharged from high pressure turbine 26 into low pressure turbine 28. The core airflow is then discharged from low pressure turbine 28 and directed downstream towards augmentor system 50. When augmentor system 50 is activated, combustion air and a portion of fan air from bypass duct 32 are channeled into augmentor system 50. Fuel is supplied via fuel spraybars 70 and is ignited by ignitors (not shown), and flameholder 72 stabilizes the flame.

Augmentor systems require a liner to prevent combustion gases within the augmentor from contacting and overheating the augmentor casing. FIG. 2 schematically illustrates an augmentor exhaust duct liner 300 and a plurality of screech suppression air holes 301 on the inner surface of liner 300. Exhaust duct inlet air flow 320 from the fan enters the augmentor bypass cooling duct 306. In order to extend liner useful life, air is passed through and out of the holes through the liner into the exhaust path for screech suppression as well as convective and film cooling. Proper sizing and density of the screech suppression air holes 301 in the forward screech suppression zone 311 of the liner 300, provide both tuned and bulk suppression of combustion driven acoustic waves in the combustion chamber reverberator. In the aft liner cooling zone 317 air flow through film cooling holes 316 provides film cooling protection for augmentor exhaust duct liner 300 itself. The screech suppression zone 311 is designed to provide acoustic damping of fluctuating pressure fields which result from combustion chamber pressure oscillations during engine operation. It has been found that the size and spacing of holes 301 in the screech suppression zone 311 may be selected to optimize screech suppression. The suppression liner is tuned to suppress acoustic resonance in the 1000 to 3000 Hertz range. It has been found that film cooling contributes to screech suppression.

As shown in FIG. 2 an augmentor cooling duct 306 is radially bounded by inner surface 308 of casing 302 and outer surface 310 of augmentor liner 304. A plurality of dams 312 are located around inner surface 308 and project into augmentor cooling duct 306 to maintain static pressure in the screech suppression zone 311 to prevent backflow of afterburner flame into the augmentor cooling duct 306 in order to prevent combustion of the cooling air within the augmentor cooling duct 306. In the FIG. 2 design, a portion of fan air is provided as exhaust duct inlet air flow 320 into the augmentor cooling duct 306. Screech suppression air flow 322 exits the cooling duct through the cooling air holes 314. The remainder of the cooling flow 321 provides liner film cooling flow 324 which flows through film cooling holes 316 in aft liner cooling zone 317 and exit nozzle cooling flow 326 to cool exhaust nozzle 318. In the FIG. 2 design, approximately 39% of exhaust duct inlet air flow 320 is used for screech suppression air flow 322, 20% is used for liner film cooling flow 324 and the remaining 41% is used for liner film cooling flow 324 and exit nozzle cooling flow 326. These air flow requirements define the amount of fan air necessary for the screech suppression and cooling functions and represent air flow losses which do not contribute to engine efficiency. Minimizing the air flow required for suppression and cooling improves overall engine efficiency.

FIG. 3 illustrates a prior art exhaust duct liner 400 disposed concentrically within augmentor casing 402 using a closed cavity screech suppressor design. A closed cavity 404 defining a screech suppression zone 411 is located on the radially exterior surface 406 of the exhaust duct liner 400 downstream of the fan exit. Liner cooling zone 408 is located downstream of the screech suppression zone 411 and the liner exit nozzle 412 is located downstream from the liner cooling zone 408. The FIG. 3 design directs approximately 18% of the augmentor inlet flow 410 through holes in the radially outer wall 414 into the closed cavity 404 and through holes 415 in the radially inner wall 416 in the screech suppression zone 411 into the exhaust duct. The closed cavity 404 allows higher pressure of air in the screech suppression zone 411 but adds weight to the liner construction and requires radial expansion of the duct flow path 418. The cooling flow required in liner cooling zone is approximately 26% of inlet flow and 42% is available for liner exit and nozzle cooling flow. This represents a reduction of 14% of fan flow that is used in the liner and corresponding increase in flow into the augmentor combustor.

Figure 4:
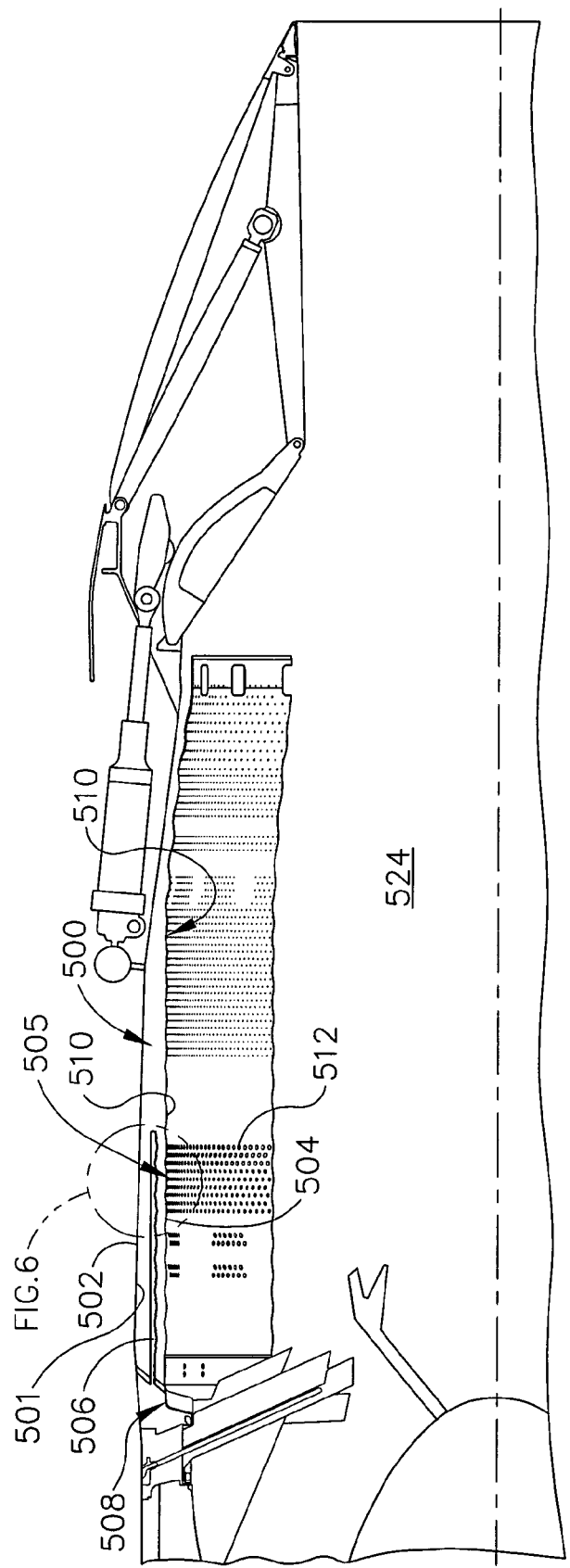
FIG. 4 is a schematic cross-sectional view of an augmentor exhaust duct liner and splitter duct.
Figure 5:
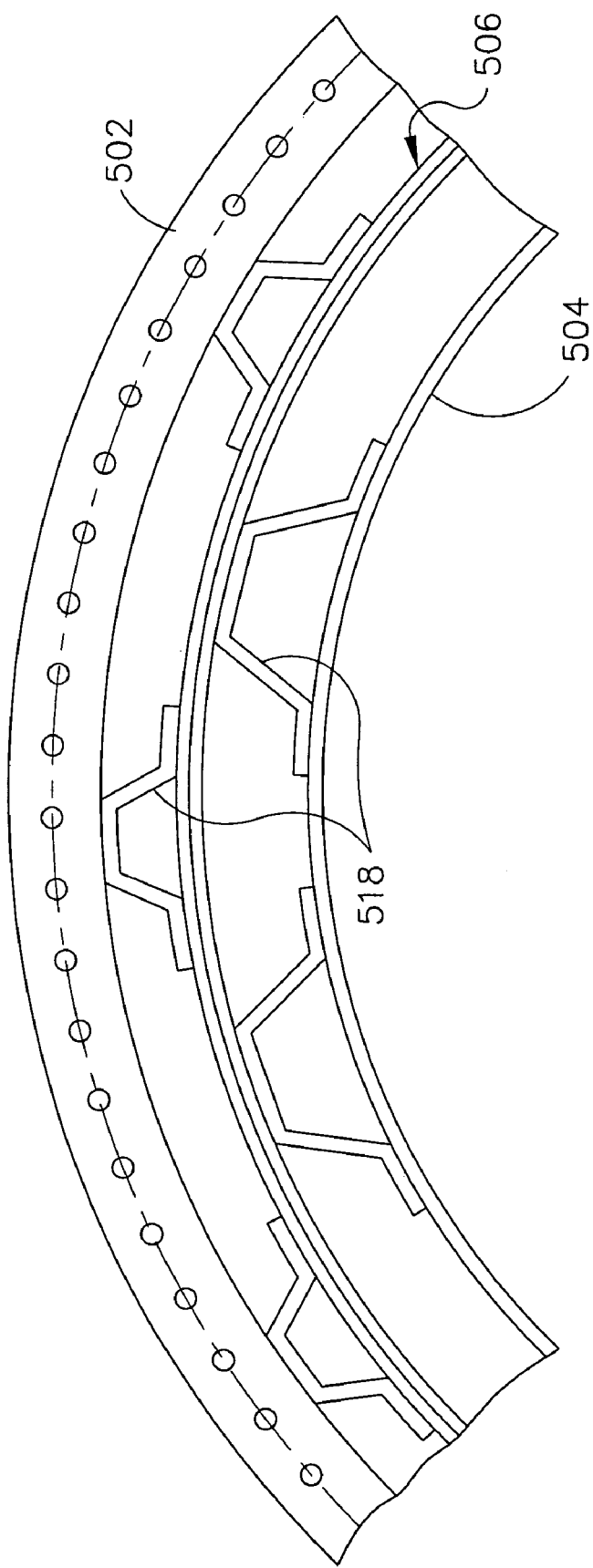
FIG. 5 is a schematic, partial view of a mounting arrangement for the splitter duct of FIG. 5.

FIG. 4 is a schematic, partial cross-sectional view of an exhaust duct liner design utilizing a flow control splitter. The annular augmentor liner cooling flow path 500 is defined between the axially extending radially inner surface 501 of generally annular augmentor outer casing 502 and the axially extending sinusoidal radially outer surface 514 of axially extending generally annular augmentor liner 504. The augmentor liner 504 is a corrugated, or hollow axially extending sinusoidal annular wall construction with cooling holes 512 passing through the augmentor liner 504 to provide film cooling of the radially inner surface 505 of the annular augmentor liner 504. As shown schematically in FIG. 5, an augmentor flow splitter duct 506 is a hollow axially extending generally cylindrical duct mounted in cantilevered fashion from the upstream end 508 of the augmentor liner 504 and concentrically with the augmentor outer casing 502 and augmentor liner 504 by a plurality of hangers 518.

Figure 6:
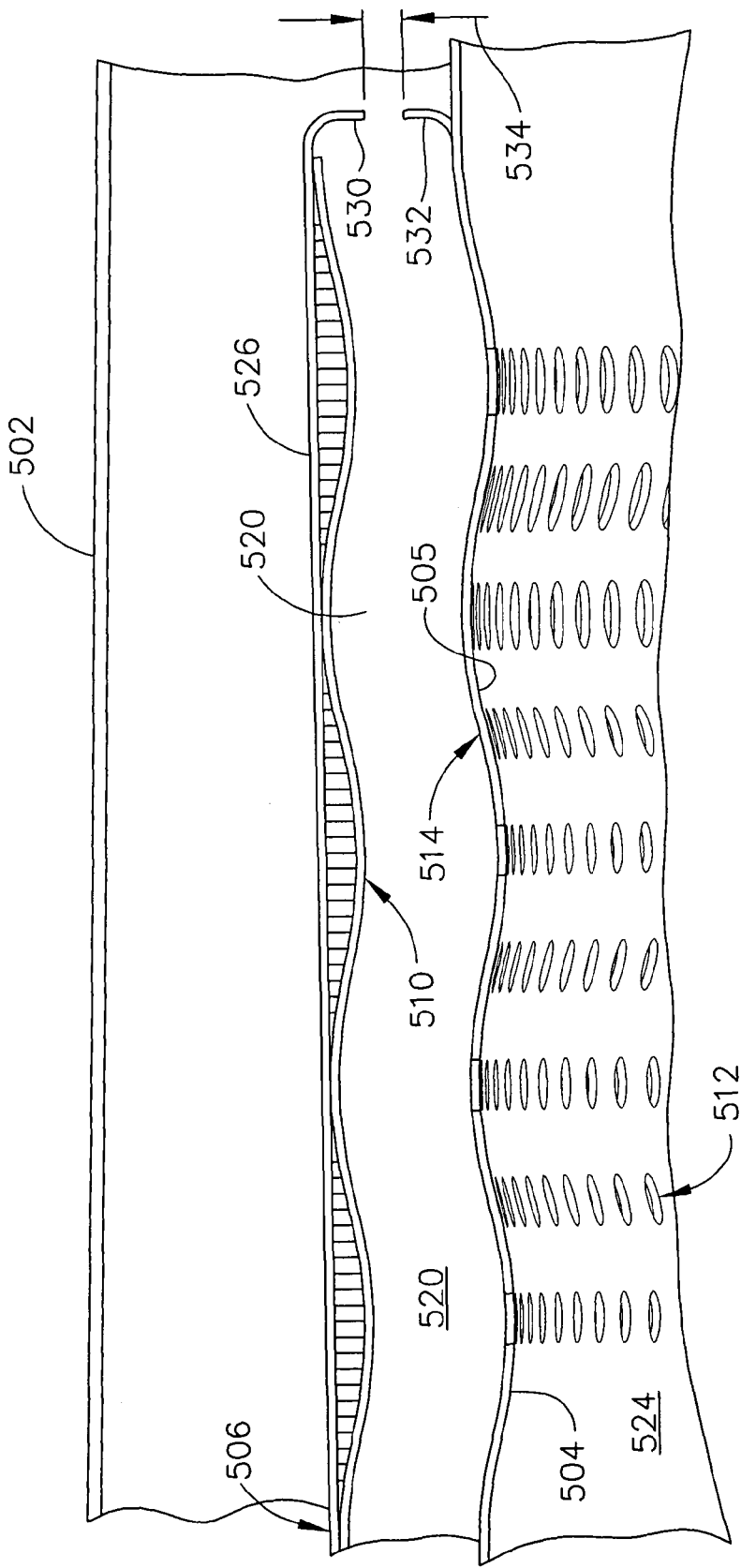
FIG. 6 is a schematic view of an alternative configuration of an augmentor exhaust duct liner.

As shown in FIG. 6, augmentor flow splitter duct 506 includes axially extending generally cylindrical radially outer surface 526 and a hollow axially extending sinusoidal radially inner surface 510 whose sinusoidal wave shape is configured to generally mirror the radially outer surface 514 of annular augmentor liner 504. The complementary sinusoidal shapes of surface 510 of the augmentor flow splitter duct 506 and surface 514 of annular augmentor liner 504 are positioned facing each other with a predetermined spacing to provide pressure control of air flow within splitter flow path 520. One or both of facing sinusoidal surfaces 510 and 514 may be axially conical and may be axially convergent or divergent, so that the annular cross-sectional area of splitter flow path 520 increases or decreases in the axial direction as needed to control air pressure within splitter flow path 520. In particular, radially inner surface 510 may be configured to have a sinusoidal annular and axially convergent conical shape converging in the axially aft direction, while radially outer surface 514 is cylindrical in the axial direction to reduce the annular cross-sectional area of splitter flow path 520 in the axially aft direction. If an increase in the cross-sectional area of flow path 520 is needed, radially inner surface 510 may be configured to have a sinusoidal annular and axially divergent conical shape in the axially aft direction, while radially outer surface 514 is cylindrical in the axially aft direction. Alternatively, radially inner surface 510 may be axially cylindrical, while radially outer surface 514 is axially convergent to provide an increase in cross-sectional area of flow path 520 or divergent to provide a reduction in cross-sectional area of flow path 520 in the axially aft direction. A radial spacing in the range of approximately 1-4 inches is typical to control static pressure in the splitter flow path 520 to prevent backflow of fuel and hot combustion gases into the splitter flow path 520 and to suppress screech tones. The diameter and spacing of holes 512 through annular augmentor liner 504 in the screech suppression zone are selected to maximize the open hole area circumferentially by row while maintaining adequate hole-to-hole distance to ensure structural integrity. The ability to maintain the static pressure within the splitter flow path 520 enables use of a low amount of the bypass air flow for screech suppression. In the FIG. 4-6 embodiment, screech suppression flow requires only about 3% of bypass flow. The remainder is available for liner cooling or augmentor combustion.

As also shown in FIG. 6, air flow blocker dams may be employed to enhance air pressure control in the splitter flow path 520. To enhance pressure control, a generally annular air flow blocker dam 530 projecting radially inwardly from the augmentor flow splitter duct 506 may be positioned at the aft end of the augmentor flow splitter duct 506. An air flow blocker dam 532 projecting radially outwardly from the annular augmentor liner 504 may be used in addition to air flow dam blocker 530 or may be used without air flow dam blocker 530. The radial spacing 534 between the augmentor flow splitter duct 506 and the augmentor liner 504 establishes a remaining circumferential flow area of splitter flow path 520 that allows air flow to continue downstream through the splitter flow path 520 and ensure adequate positive backflow margin against a negative air pressure relationship between the air flow within splitter flow path 520 and air flow within augmentor combustion flow path 524. One or both of air flow blocker dams 530 and 532 may be used with a cylindrical, converging or diverging splitter flow path 520 to control air pressure in the splitter flow path 520. The radial spacing 534 between blocker dam 530 and blocker dam 532 is set to a predetermined height to ensure positive backflow margin is maintained throughout the splitter flow path 520. In designs using only one of the blocker dams, a radial spacing between blocker dam 530 and radially outer surface 514 of augmentor liner 504 or a radial spacing between blocker dam 532 and radially inner surface 510 of augmentor flow splitter duct 506 is selected to provide the required flow and pressure control.

In operation, a predetermined portion of the engine fan air flow enters the flow inlet end of the augmentor combustion flow path 524. A part of that inlet flow enters the annular augmentor liner cooling flow path 500 and air flow through holes 512 in augmentor flow splitter duct 506 provides air flow to splitter flow path 520 in the screech suppression zone, and the remainder of the inlet flow travels over the radially outer surface 526 of the augmentor flow splitter duct 506 and downstream to the annular augmentor liner cooling flow path 500. Air flow through holes 512 in the augmentor flow splitter duct 506 in the screech suppression zone suppresses screech and cools the radially inner surface 505 of annular augmentor liner 504. The remaining cooling flow supplies liner film cooling flow through cooling holes through the liner 504 and the tailpipe and maintains a positive backflow pressure margin along the cooling hole pattern on the augmentor liner 504.

While the invention has been described in terms of various specific embodiments, those skilled in the art will recognize that the invention can be practiced with modification within the spirit and scope of the claims.

What is claimed is:

1. A gas turbine engine assembly having a core gas turbine engine and an augmentor assembly configured to be disposed axially aft of the core gas turbine engine, said augmentor assembly including a flow splitter apparatus comprising: an augmentor outer casing; an augmentor liner configured to be disposed radially within and radially spaced apart from said augmentor outer casing to define an augmentor liner cooling flow path between said augmentor casing and said annular augmentor liner; and an axially extending augmentor flow splitter duct disposed at the upstream end of said augmentor liner and radially between said augmentor outer casing and said annular augmentor liner within the augmentor liner cooling flow path and defining a splitter portion of the augmentor liner cooling flow path, wherein the splitter portion includes an axially forward open end and an axially aft open end such that air is permitted to flow axially through a screech suppression zone from the axially forward open end through the axially aft open end between said augmentor liner and said augmentor flow splitter duct.

2. The invention of claim 1 further comprising at least one air flow blocker dam spaced circumferentially uniformly around said cooling duct and reducing the splitter flow path cross-sectional area.

3. An augmentor assembly for a gas turbine engine assembly having a core gas turbine engine, said augmentor assembly is configured for disposition axially aft of the core gas turbine engine and comprises:
   an augmentor outer casing;
   an augmentor liner configured to be disposed radially within said augmentor outer casing and radially spaced apart from said augmentor outer casing to define an augmentor liner cooling flow path; and
   an augmentor flow splitter duct configured to be disposed radially between said augmentor outer casing and said augmentor liner within the augmentor liner cooling flow path, said augmentor flow splitter duct configured to define a splitter portion of the augmentor liner cooling flow path, wherein the splitter portion includes an axially forward open end and an axially aft open end such that air is permitted to flow axially through a screech suppression zone from the axially forward open end through the axially aft open end between said augmentor liner and said augmentor flow splitter duct.

4. The apparatus of claim 3, wherein: said annular augmentor liner includes an axially extending sinusoidal axially convergent radially outer surface; and said generally annular augmentor flow splitter duct includes a generally axially cylindrical axially extending sinusoidal radially inner surface facing said radially outer surface of said annular augmentor liner.

5. The augmentor assembly of claim 3, wherein:
   said augmentor liner comprises a sinusoidal surface; and
   said augmentor flow splitter duct comprises a sinusoidal surface configured to face said sinusoidal surface of said augmentor liner.

6. The apparatus of claim 3, wherein: said annular augmentor liner includes an axially extending sinusoidal axially divergent radially outer surface; and said generally annular augmentor flow splitter duct includes a generally axially convergent axially extending sinusoidal radially inner surface facing said radially outer surface of said annular augmentor liner.

7. The augmentor assembly of claim 3, further comprising:
   a first air flow blocker dam configured to be disposed axially aft of said augmentor flow splitter duct and to extend radially inwardly of said augmentor flow splitter duct so as to form a first wall perpendicular to the airflow.

8. The augmentor assembly of claim 7, further comprising: a second air flow blocker dam configured to be disposed axially aft of said augmentor flow splitter duct and to extend radially outwardly of said augmentor liner so as to form a second wall perpendicular to the airflow.

9. The augmentor assembly of claim 3, further comprising: an air flow blocker dam configured to be disposed axially aft of said augmentor flow splitter duct and to extend radially outwardly of said augmentor liner so as to form a wall perpendicular to the airflow.

10. A method of operating a gas turbofan engine including a core gas turbine engine and an augmentor configured to be disposed axially aft of the core gas turbine engine, said method comprising the steps of: directing a portion of fan bypass air flow into an annular augmentor liner cooling flow path defined by a radially inner surface of an augmentor outer casing and a radially outer surface of an augmentor liner; directing a portion of said flow through said augmentor liner cooling flow path into an annular splitter flow path comprising a screech suppression zone disposed radially outside said radially outer surface of said augmentor liner and disposed radially inside an augmentor flow splitter duct extending axially aft from a forward end of said augmentor liner; and maintaining positive backflow pressure margin between air flow within said splitter flow path and said augmentor liner cooling flow path.

11. The method of claim 10 wherein said method further comprises the step of: maintaining a predetermined air pressure within said splitter flow path flow to prevent combustion gas ingestion into said annular augmentor liner cooling flow path.

* * * * *